(12) United States Patent
Koo et al.

(10) Patent No.: US 11,600,120 B2
(45) Date of Patent: Mar. 7, 2023

(54) APPARATUS FOR DIAGNOSING ABNORMALITY IN VEHICLE SENSOR AND METHOD THEREOF

(71) Applicants: Hyundai Motor Company, Seoul (KR); Kia Motors Corporation, Seoul (KR); AJOU UNIVERSITY INDUSTRY-ACADEMIC COOPERATION FOUNDATION, Suwon-si (KR)

(72) Inventors: Jung Mo Koo, Gwangmyeong-si (KR); Sang Pil Hwang, Suwon-si (KR); Yong Gyun Kim, Gwangmyeong-si (KR); Beom Geum Cho, Suwon-si (KR); Min Sang Kim, Seoul (KR); Hyung Il Koo, Suwon-si (KR); So Yeon Kim, Suwon-si (KR)

(73) Assignees: Hyundai Motor Company, Seoul (KR); Kia Motors Corporation, Seoul (KR); Ajou University Industry-Academic Cooperation Foundation, Suwon-si (KR)

( * ) Notice: Subject to any disclaimer, the term of this patent is extended or adjusted under 35 U.S.C. 154(b) by 291 days.

(21) Appl. No.: 16/882,873

(22) Filed: May 26, 2020

(65) Prior Publication Data

US 2021/0150833 A1 May 20, 2021

(30) Foreign Application Priority Data

Nov. 19, 2019 (KR) ........................ 10-2019-0148203

(51) Int. Cl.
G07C 5/08 (2006.01)
G06N 3/08 (2023.01)
G06V 20/56 (2022.01)

(52) U.S. Cl.
CPC ............. *G07C 5/0816* (2013.01); *G06N 3/08* (2013.01); *G06V 20/56* (2022.01); *G07C 5/0808* (2013.01)

(58) Field of Classification Search
CPC .... G07C 5/0816; G07C 5/0808; G06V 20/56; G06N 3/08
See application file for complete search history.

(56) References Cited

U.S. PATENT DOCUMENTS

| 7,308,432 | B2 | 12/2007 | Torii et al. | |
| 10,297,070 | B1 * | 5/2019 | Zhu | G06K 9/6256 |
| 11,187,793 | B1 * | 11/2021 | Liu | G05D 1/0088 |

(Continued)

FOREIGN PATENT DOCUMENTS

| EP | 1449743 B1 | 4/2013 |
| JP | 2009074859 A | 4/2009 |

(Continued)

*Primary Examiner* — Ernest G Tacsik
(74) *Attorney, Agent, or Firm* — Slater Matsil, LLP

(57) ABSTRACT

An apparatus for diagnosing an abnormality of a vehicle sensor is provided. The apparatus includes a sensor configured to measure an acceleration and an angular velocity of a vehicle, a camera configured to generate a front time series image frame of the vehicle, and a controller configured to estimate the acceleration and the angular velocity of the vehicle by using the front time series image frame generated by the camera and diagnose an abnormality in the sensor based on the acceleration and the angular velocity of the vehicle estimated by the controller.

17 Claims, 9 Drawing Sheets

(56) References Cited

U.S. PATENT DOCUMENTS

| | | | |
|---|---|---|---|
| 2004/0162644 A1 | 8/2004 | Torii et al. | |
| 2017/0168586 A1* | 6/2017 | Sinha | G06V 40/11 |
| 2017/0345161 A1* | 11/2017 | Takatani | G06T 7/73 |
| 2019/0258251 A1* | 8/2019 | Ditty | G06V 20/58 |
| 2020/0008028 A1 | 1/2020 | Yang | |
| 2020/0160070 A1* | 5/2020 | Sholingar | G06N 3/0445 |
| 2020/0302634 A1* | 9/2020 | Pollefeys | G06T 7/70 |
| 2020/0363815 A1* | 11/2020 | Mousavian | G06K 9/627 |
| 2020/0364508 A1* | 11/2020 | Gurel | G06V 20/41 |
| 2021/0004983 A1* | 1/2021 | Fischer | G06T 7/251 |
| 2021/0065241 A1* | 3/2021 | Chakravarty | G06Q 30/0261 |
| 2021/0213973 A1* | 7/2021 | Carillo | G06T 7/246 |

FOREIGN PATENT DOCUMENTS

| | | |
|---|---|---|
| KR | 20140025244 A | 3/2014 |
| KR | 101685151 B1 | 12/2016 |
| KR | 101974122 B1 | 4/2019 |
| WO | 2018170883 A1 | 9/2018 |

* cited by examiner

APPARATUS FOR DIAGNOSING ABNORMALITY IN VEHICLE SENSOR AND METHOD THEREOF

CROSS-REFERENCE TO RELATED APPLICATIONS

This application claims priority to Korean Patent Application No. 10-2019-0148203, filed in the Korean Intellectual Property Office on Nov. 19, 2019, which application is hereby incorporated herein by reference.

TECHNICAL FIELD

The present disclosure relates to a technique for diagnosing an abnormality in a sensor based on vehicle behavior information.

BACKGROUND

Recently, an autonomous emergency braking (AEB) system, a forward collision warning (FCW) system, an adaptive cruise control (ACC) system, a lane departure warning system (LDWS), a lane keeping assist system (LKAS), a blind spot detection (BSD) apparatus, a rear-end collision warning (RCW) system, a smart parking assist system (SPAS), and the like have been mounted on a vehicle.

In addition, various sensors, such as a camera sensor, a light detection and ranging (LiDAR) sensor, a radio detection and ranging (RADAR) sensor, an ultrasonic sensor, a gyro sensor, an acceleration sensor, and the like, are provided in a vehicle to operate the various systems described above normally. In this case, the gyro sensor and the acceleration sensor may cause measurement errors due to impact on the vehicle while driving and deterioration over time.

In general, a technique for correcting a bias error of a gyro sensor extracts feature points between successive image frames output from an image sensor, converts a movement displacement between the extracted feature points into a posture angle, and extracts an angular velocity by dividing the converted movement displacement by the frequency of the image frame, and corrects the error of the gyro sensor based on the extracted angular velocity.

Such a conventional technique discloses a technique for extracting feature points in a 'Harris corner detection' scheme and matching feature points in an 'optical flow' scheme to estimate the angular velocity. However, there has been disclosed no technique for estimating the angular velocity based on an artificial neural network (ANN). In particular, according to the related art, only a technique for estimating an angular velocity has been disclosed, but any techniques for estimating an angular velocity and an acceleration together have not been disclosed.

The matters described in this background section are intended to promote an understanding of the background of the disclosure and may include matters that are not already known to those of ordinary skill in in the art.

SUMMARY

Embodiments of the present disclosure have been made to solve problems occurring in the prior art while advantages achieved by the prior art are maintained intact.

An embodiment of the present disclosure provides an apparatus for diagnosing an abnormality in a vehicle sensor and a method thereof capable of estimating the behavior of a vehicle by using a time series image frame of a camera mounted on a vehicle, and diagnosing an abnormality in the vehicle sensor based on the estimated behavior information, thereby preventing a traffic accident that may occur due to an abnormality in the vehicle sensor.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, an apparatus for diagnosing an abnormality of a vehicle sensor includes a sensor that measures an acceleration and an angular velocity of a vehicle, a camera that generates a front time series image frame of the vehicle, and a controller that estimates the acceleration and the angular velocity of the vehicle by using the time series image frame generated by the camera and diagnoses the abnormality in the sensor based on the estimated acceleration and angular velocity of the vehicle.

The controller may include a first pose network that predicts first pose information of the camera by using an image at a time point of t−1 and an image at a time point of t, a second pose network that predicts second pose information of the camera by using an image at a time point of t−2 and the image at the time point of t−1, a 6-dimension (6D) estimation network that estimates the acceleration and the angular velocity of the vehicle by using the first pose information and the second pose information, and a diagnostic device that compares the acceleration and the angular velocity of the vehicle estimated by the 6D estimation network with the acceleration and the angular velocity of the vehicle measured by the sensor to diagnose the abnormality in the sensor.

The diagnostic device may diagnose that an abnormality occurs in an acceleration sensor in the sensor when an error of the acceleration measured by the acceleration sensor is not included in a first error range based on the acceleration estimated by the 6D estimation network.

The diagnostic device may diagnose that an abnormality occurs in a gyro sensor in the sensor when an error of the angular velocity measured by the gyro sensor is not included in a second error range based on the angular velocity estimated by the 6D estimation network.

The first pose information may include rotation information ($R_{t-2 \to t-1}$) and location information ($L_{t-2 \to t-1}$), and the second pose information may include rotation information ($R_{t-1 \to t}$) and location information ($L_{t-1 \to t}$).

The first and second pose networks may be convolutional neural networks (CNNs), and the 6D estimation network may be a multi-layer perceptron network.

The controller may include a pose network that predicts first pose information of the camera by using an image at a time point of t−1 and an image at a time point of t and second pose information of the camera by using an image at a time point of t−2 and the image at the time point of t−1, a 6D estimation network that estimates the acceleration and the angular velocity of the vehicle by using the first pose information and the second pose information, and a diagnostic device that compares the acceleration and the angular velocity of the vehicle estimated by the 6D estimation network with the acceleration and the angular velocity of the vehicle measured by the sensor to diagnose the abnormality in the sensor.

The diagnostic device may diagnose that an abnormality occurs in an acceleration sensor in the sensor when an error of the acceleration measured by the acceleration sensor is not included in a first error range based on the acceleration estimated by the 6D estimation network.

The diagnostic device may diagnose that an abnormality occurs in a gyro sensor in the sensor when an error of the angular velocity measured by the gyro sensor is not included in a second error range based on the angular velocity estimated by the 6D estimation network.

The first pose information may include rotation information ($R_{t-2 \to t-1}$) and location information ($L_{t-2 \to t-1}$), and the second pose information may include rotation information ($R_{t-1 \to t}$) and location information ($L_{t-1 \to t}$).

The first and second pose networks may be convolutional neural networks (CNNs), and the 6D estimation network may be a multi-layer perceptron network.

According to another embodiment of the present disclosure, a method of diagnosing an abnormality of a vehicle sensor may include measuring, by a sensor, an acceleration and an angular velocity of a vehicle, generating, by a camera, a front time series image frame of the vehicle, and estimating, by a controller, the acceleration and the angular velocity of the vehicle by using the time series image frame generated by the camera and diagnosing the abnormality in the sensor based on the estimated acceleration and angular velocity of the vehicle.

The diagnosing of the abnormality in the sensor may include predicting first pose information of the camera by using an image at time point of t−1 and an image at a time point of t, predicting second pose information of the camera by using an image at a time point of t−2 and the image at the time point of t−1, estimating the acceleration and the angular velocity of the vehicle by using the first pose information and the second pose information, diagnosing an abnormality in an acceleration sensor by comparing the estimated acceleration with the measured acceleration, and diagnosing an abnormality in a gyro sensor by comparing the estimated angular velocity with the measured angular velocity.

The diagnosing of the abnormality in the acceleration sensor may include determining whether an error of the measured acceleration is included in a first error range based on the estimated acceleration, diagnosing that an abnormality occurs in the acceleration sensor when the error of the measured acceleration is not included in the first error range, as a determination result, and diagnosing that the abnormality does not occur in the acceleration sensor when the error of the measured acceleration is included in the first error range, as the determination result.

The diagnosing of the abnormality in the gyro sensor may include determining whether an error of the measured angular velocity is included in a second error range based on the estimated angular velocity, diagnosing that an abnormality occurs in the gyro sensor when the error of the measured angular velocity is not included in the second error range, as a determination result, and diagnosing that the abnormality does not occur in the gyro sensor when the error of the measured angular velocity is included in the second error range, as the determination result.

The first pose information may include rotation information ($R_{t-2 \to t-1}$) and location information ($L_{t-2 \to t-1}$), and the second pose information may include rotation information ($R_{t-1 \to t}$) and location information ($L_{t-1 \to t}$).

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
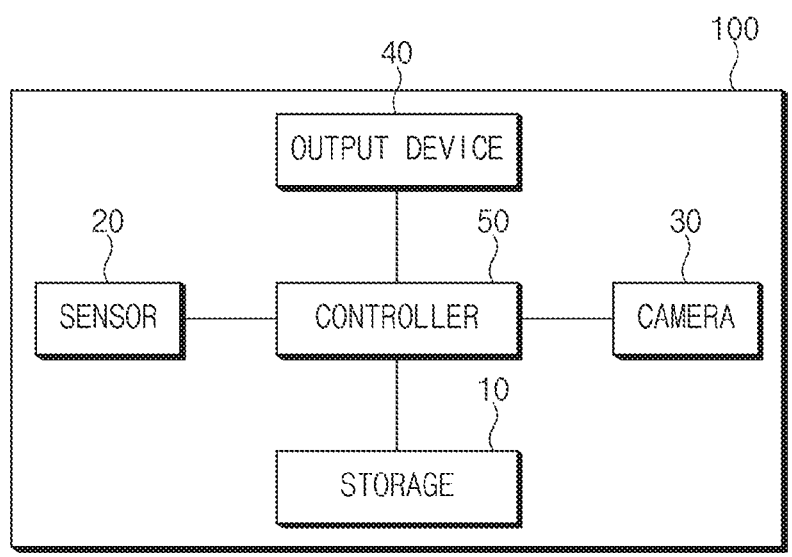
FIG. 1 is a block diagram illustrating an apparatus for diagnosing an abnormality in a vehicle sensor according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating an apparatus for diagnosing an abnormality in a vehicle sensor according to an embodiment of the present disclosure.

As shown in FIG. 1, an apparatus 100 for diagnosing an abnormality in a vehicle sensor according to an embodiment of the present disclosure may include storage 10, a sensor 20, a camera 30, an output device 40, and a controller 50. In this case, according to a scheme of implementing the apparatus 100 for diagnosing an abnormality in a vehicle sensor according to an embodiment of the present disclosure, each component may be combined with each other to be implemented as one, and some components may be omitted.

Regarding each component, first, the storage 10 may store various logic, algorithms and programs required in the processes of estimating the behavior of a vehicle by using a time series image frame of the camera 30 mounted on the vehicle, and diagnosing an abnormality in the vehicle sensor based on the estimated behavior information.

In particular, the storage 10 may store an artificial neural network (ANN), such as a pose network, a 6D estimation network, and the like, used in the process of estimating the behavior of a vehicle by using a time series image frame generated by the camera 30 of the vehicle. In this case, the pose network, which is a network in which deep learning has been completed, may predict a pose (rotation information and location information) of the camera 30 by using a time series image frame. In this case, the pose of the camera 30 is the same as that of the vehicle. In addition, the 6D estimation network, which is a network in which deep learning has been completed, may estimate an acceleration and an angular velocity of the vehicle based on the rotation information and the location information predicted by the pose network.

In addition, the storage 10 may store the time series image frame photographed by the camera 30.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, and an optical disk type memory.

Next, the sensor 20 may include a sensor for measuring the angular velocity (e.g., a gyro sensor) of the vehicle and a sensor for measuring the acceleration of the vehicle (e.g., an acceleration sensor).

For reference, the output of the gyro sensor is the sum of an error (e_sf) caused by a scale factor and an error (e_temp) caused by a temperature and an error (e_bias) caused by a bias, combined with a true value ($\omega$_true) of the angular velocity. In this case, because the errors caused by the scale factor and the temperature are not the subject matters of the present disclosure, it is assumed that the errors are pre-corrected through a heuristic scale factor regulation (HSR) and a temperature compensation algorithm, which are techniques well-known in the art. In an embodiment of the present disclosure, a process of diagnosing and correcting a bias error of a gyro sensor by using an angular velocity estimated by using a time series image frame will be described.

In addition, the output cycle of the gyro sensor is at least 100 Hz faster than that of the camera 30. Because the camera 30 has a relatively large amount of computation, the output cycle is slower than the gyro sensor. Therefore, it is preferable to design an embodiment of the present disclosure to operate corresponding to the output cycle of the camera 30.

Meanwhile, the acceleration sensor, which is a sensor that processes the output signal to measure dynamic forces such as an acceleration of an object, a vibration, an impact, and the like, may be implemented with an electronic acceleration sensor and a voltage acceleration sensor. For reference, the electronic acceleration sensor measures the value corresponding to the moving amount of the moving object by using the electromotive force of a magnet and a coil as the acceleration, and the voltage acceleration sensor uses a piezoelectric element that generates a voltage when a pressure is applied thereto to measure a value corresponding to the applied pressure as the acceleration.

Next, the camera 30, which is a monocular camera, may be mounted on a vehicle to take a time series image (video) in front of the vehicle. The time series image may be a black box image.

The camera 30 may be fixed to the inside of a vehicle to photograph a high-quality image of 15 frames or more per second. As an example, the camera 30 may photograph an HD image having a resolution of 1280×720.

The output device 40 may visually or audibly inform a driver of a diagnosis result. Of course, the diagnosis result may be announced simultaneously in both visual and audible manners.

The output device 40 may be implemented as a cluster, an audio video navigation (AVN) system, a head up display (HUD), a head unit, and the like.

The controller 50 performs the overall control such that each component can perform its functions normally. The controller 50 may be implemented in the form of hardware or software, or may be implemented in the form of a combination of hardware and software. Preferably, the controller 50 may be implemented with a microprocessor, but is not limited thereto.

In particular, the controller 50 may perform various control processes in the operations of estimating the behavior of the vehicle by using the time series image frame generated by the camera 30 of the vehicle, and diagnosing an abnormality in a vehicle sensor based on the estimated behavior information.

In addition, when it is diagnosed that there is an abnormality in the sensor 20, the controller 50 may control the output device 40 to inform the driver of the abnormality in the sensor 20.

Hereinafter, the operation of the controller 50 will be described in detail with reference to FIGS. 2 to 6.

Figure 2:
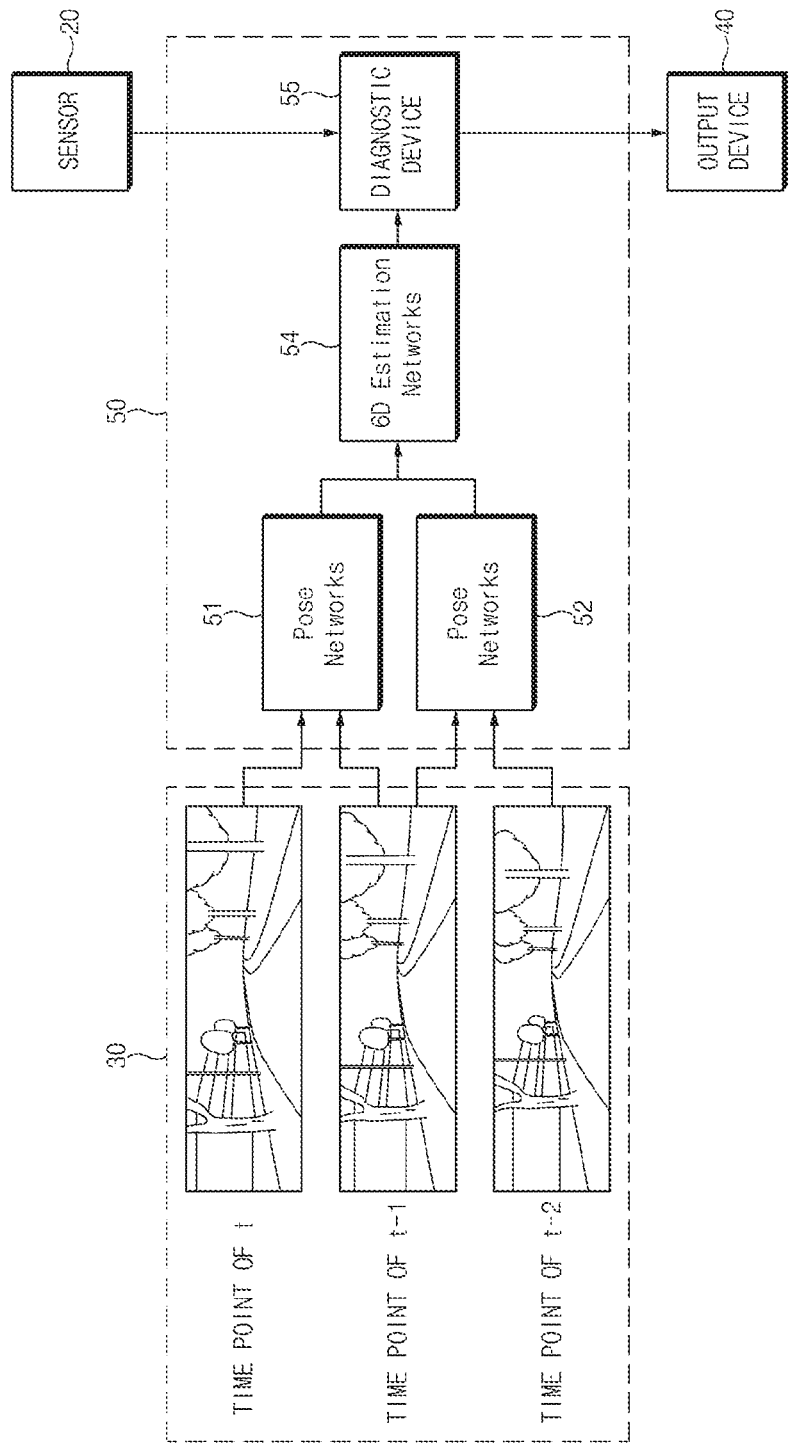
FIG. 2 is a block diagram illustrating one example of a controller provided in an apparatus for diagnosing an abnormality in a vehicle sensor according to an embodiment of the present disclosure.

FIG. 2 is a block diagram illustrating one example of a controller provided in an apparatus for diagnosing an abnormality in a vehicle sensor according to an embodiment of the present disclosure.

As shown in FIG. 2, the controller 50 provided in the apparatus for diagnosing an abnormality in a vehicle sensor according to an embodiment of the present disclosure may include a first pose network 51, a second pose network 52, a 6D estimation network 54, and a diagnostic device 55. In this case, the first and second pose networks 51 and 52 have the same structure and the same parameters, and perform the same function.

Looking at the respective components described above, as an example, the first pose network 51 may be implemented as a convolutional neural network (CNN), and predict pose information of the camera 30 by using a previous image (the image at a time point of t−1) and a current image (the image at a time point of t). In this case, the pose information may include rotation information ($R_{t-1 \to t}$) and location information ($L_{t-1 \to t}$).

For example, the second pose network 52 may be implemented as a convolutional neural network (CNN), and predict pose information of the camera 30 by using a previous image (the image at a time point of t−2) and a current image (the image at a time point of t−1). In this case, the pose information may include rotation information ($R_{t-2 \to t-1}$) and location information ($L_{t-2 \to t-1}$).

The 6D estimation network 54 may be implemented as, for example, a multi-layer perceptron network, and estimate the acceleration and angular velocity of the vehicle by using the first pose information predicted by the first pose network 51 and the second pose information predicted by the second pose network 52.

The diagnostic device 55 may diagnose an abnormality in the sensor 20 by comparing the acceleration and angular velocity estimated by the 6D estimation network 54 with the acceleration and angular velocity measured by the sensor 20. That is, based on the acceleration and angular velocity estimated by the 6D estimation network 54, the diagnostic device 55 may diagnose that an abnormality occurs in the acceleration sensor when the error of the acceleration measured by the acceleration sensor is not in the first error range. In addition, when the error of the angular velocity measured by the gyro sensor is not included in the second error range, the diagnostic device 55 may diagnose that an abnormality occurs in the gyro sensor.

Figure 3:
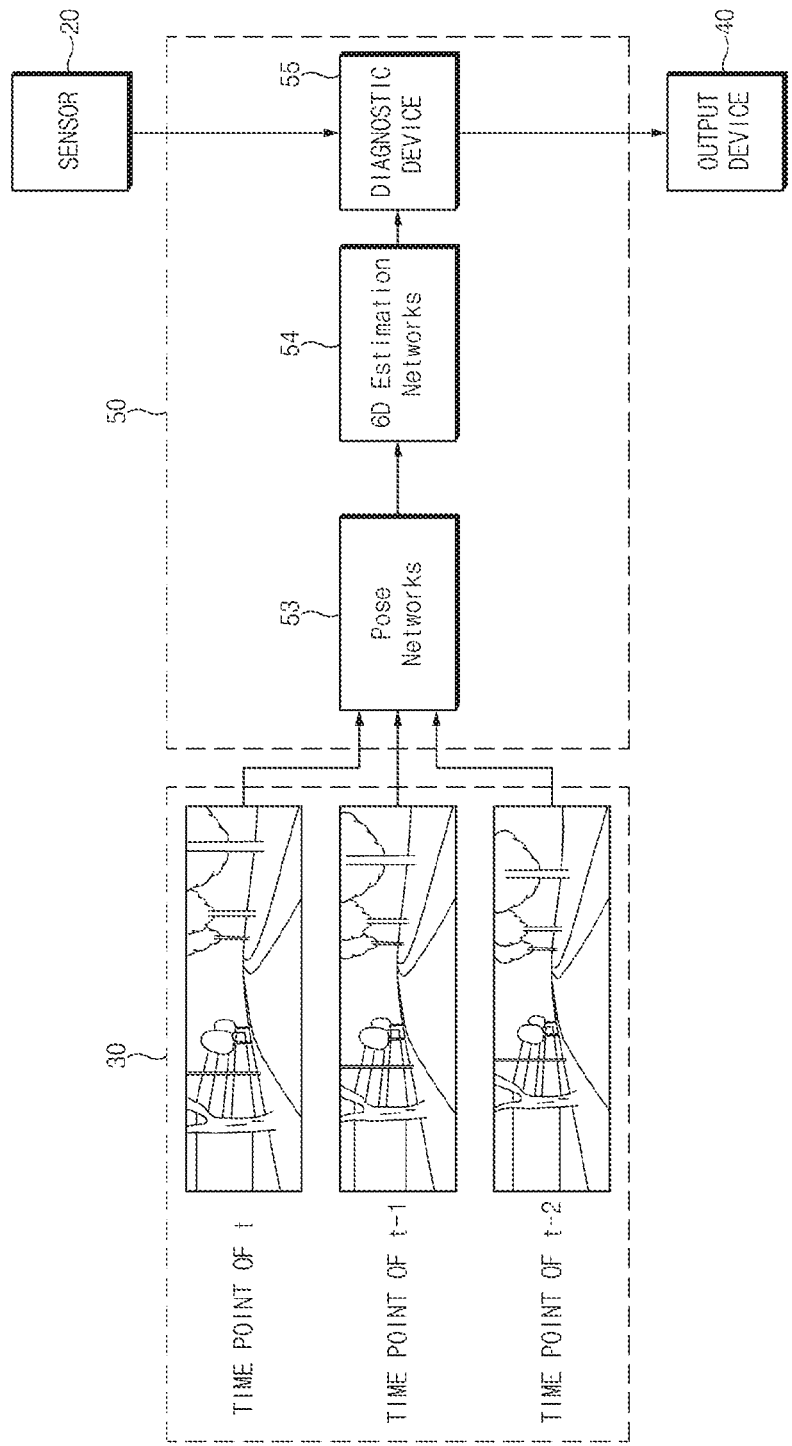
FIG. 3 is a block diagram illustrating another example of a controller provided in an apparatus for diagnosing an abnormality in a vehicle sensor according to another embodiment of the present disclosure.

FIG. 3 is a block diagram illustrating another example of a controller provided in an apparatus for diagnosing an abnormality in a vehicle sensor according to another embodiment of the present disclosure. Because only the configuration of a pose network 53 is different when compared to FIG. 2, only the operation of the pose network 53 will be described.

As shown in FIG. 3, the pose network 53, which is a module that performs both the operation of the first pose network 51 and the operation of the second pose network 52, may be implemented as a convolutional neural network (CNN). The pose network 53 may predict the first pose information of the camera 30 by using the previous image (the image at a time point of t−1) and the current image (the image at a time point of t), and predict the second pose information of the camera 30 by using a previous image (the image at a time point of t−2) and the current image (the image at a time point of t−1).

That is, the pose network 53 may predict rotation information ($R_{t-1 \to t}$) and location information ($L_{t-1 \to t}$) as the first pose information, and rotation information ($R_{t-2 \to t-1}$) and location information ($L_{t-2 \to t-1}$) as the second pose information.

Figure 4:
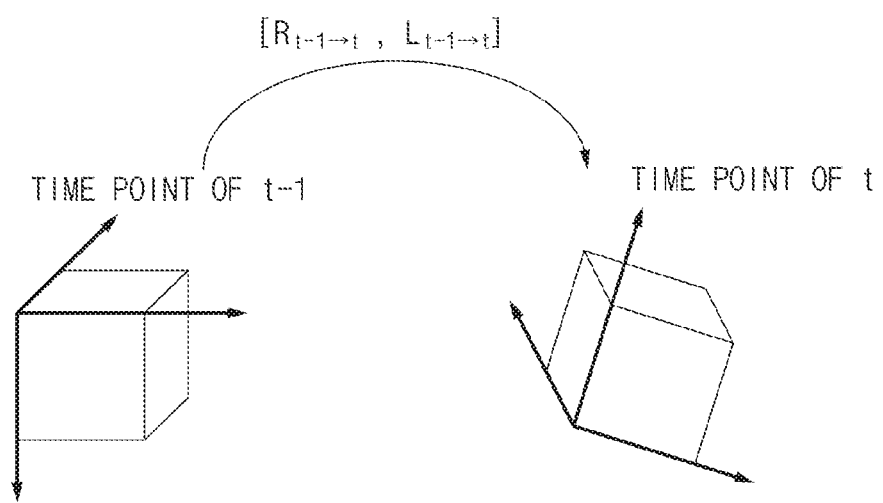
FIG. 4 is a view illustrating the operation of a pose network provided in an apparatus for diagnosing an abnormality in a vehicle sensor according to an embodiment of the present disclosure.

FIG. 4 is a view illustrating the operation of a pose network provided in an apparatus for diagnosing an abnormality in a vehicle sensor according to an embodiment of the present disclosure.

As shown in FIG. 4, based on Euler angle and 3D translation, the first pose network 51 provided in an apparatus for diagnosing an abnormality in a vehicle sensor according to an embodiment of the present disclosure may predict rotation information and location information of the camera 30 from an image at a time point of t−1 and an image at a time point of t. In this case, the first pose network 51 may include, for example, seven convolutional layers.

In addition, based on Euler angle and 3D translation, the second pose network 52 may predict the rotation information and location information of the camera 30 from an image at a time point of t−2 and an image at a time point of t−1. In this case, the second pose network 52 may include, for example, seven convolutional layers.

In addition, based on Euler angle and 3D translation, the pose network 53 may predict the first rotation information and the first location information of the camera 30 from the image at the time point of t−1 and the image at the time point of t, and the second rotation information and the second location information of the camera 30 from the image at the time point of t−2 and the image at the time point of t−1. In this time, the pose network 53 may include, for example, seven convolutional layers.

Figure 5:
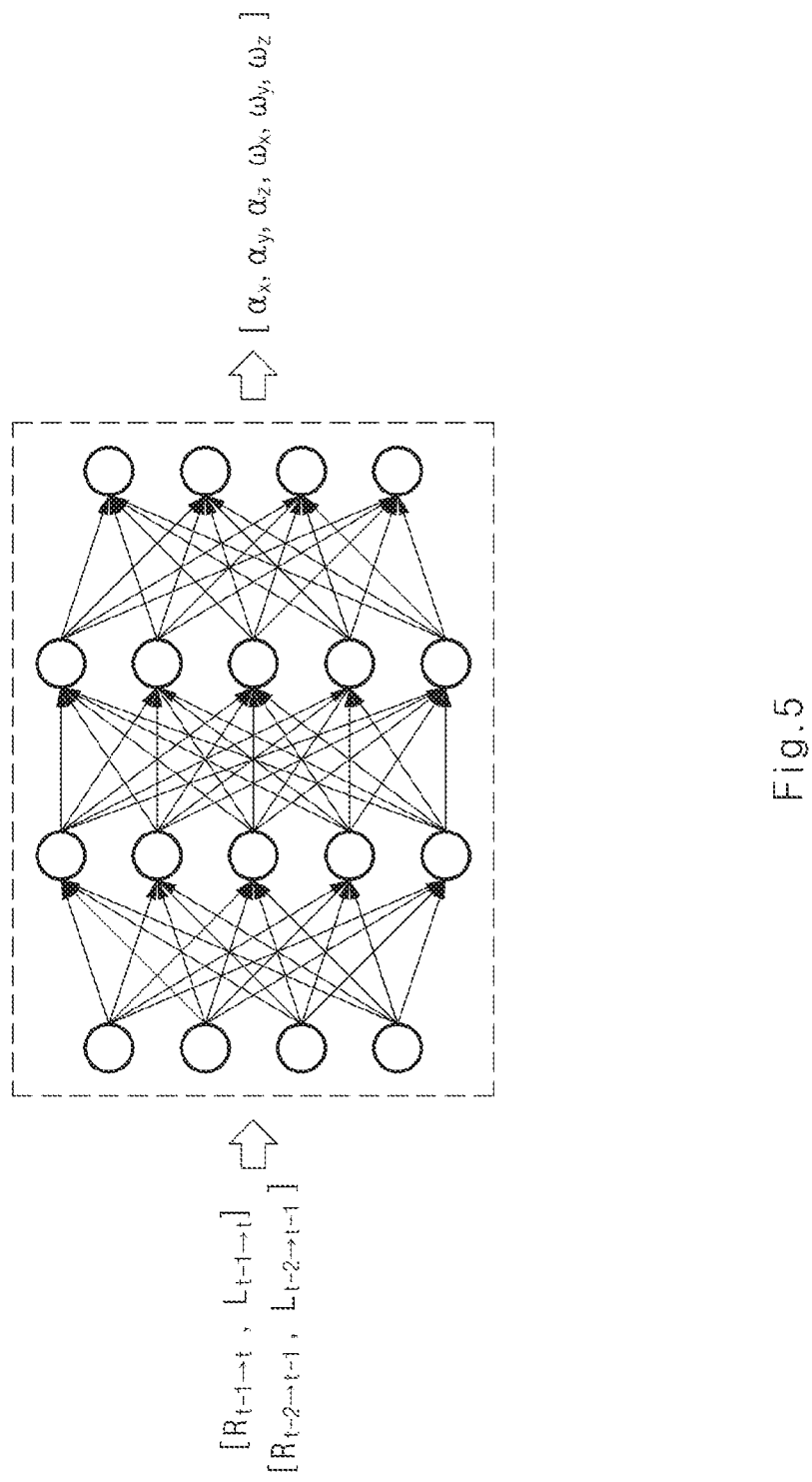
FIG. 5 is a view illustrating the operation of the 6D estimation network provided in an apparatus for diagnosing an abnormality in a vehicle sensor according to an embodiment of the present disclosure.

FIG. 5 is a view illustrating the operation of the 6D estimation network provided in an apparatus for diagnosing an abnormality in a vehicle sensor according to an embodiment of the present disclosure.

As shown in FIG. 5, the 6D estimation network 54 provided in an apparatus for diagnosing an abnormality in a vehicle sensor according to an embodiment of the present disclosure is implemented as, for example, a multi-layer perceptron network.

The 6D estimation network 54 may use the first pose information predicted by the first pose network 51 and the second pose information predicted by the second pose network 52 to estimate acceleration ($a_x$, $a_y$, $a_z$) and angular velocity ($w_x$, $w_y$, $w_z$).

In addition, the 6D estimation network 54 may use the first pose information and the second pose information predicted by the pose network 53 to estimate acceleration ($\alpha_x$, $\alpha_y$, $\alpha_z$) and angular velocity ($\omega_x$, $\omega_y$, $\omega_z$).

In addition, the 6D estimation network 54 may perform supervised learning while the parameters of the pose network 53 are fixed. Thus, the 6D estimation network 54 may mitigate a pose error due to the installation location and performance difference of the camera 30. In addition, although the training of the pose network 53 requires a lot of test data, in the state where the parameters of the pose network 53 are fixed, it is possible to perform the learning to a reference level even with hundreds of image frames in the supervised learning of the 6D estimation network 54.

Figure 6:
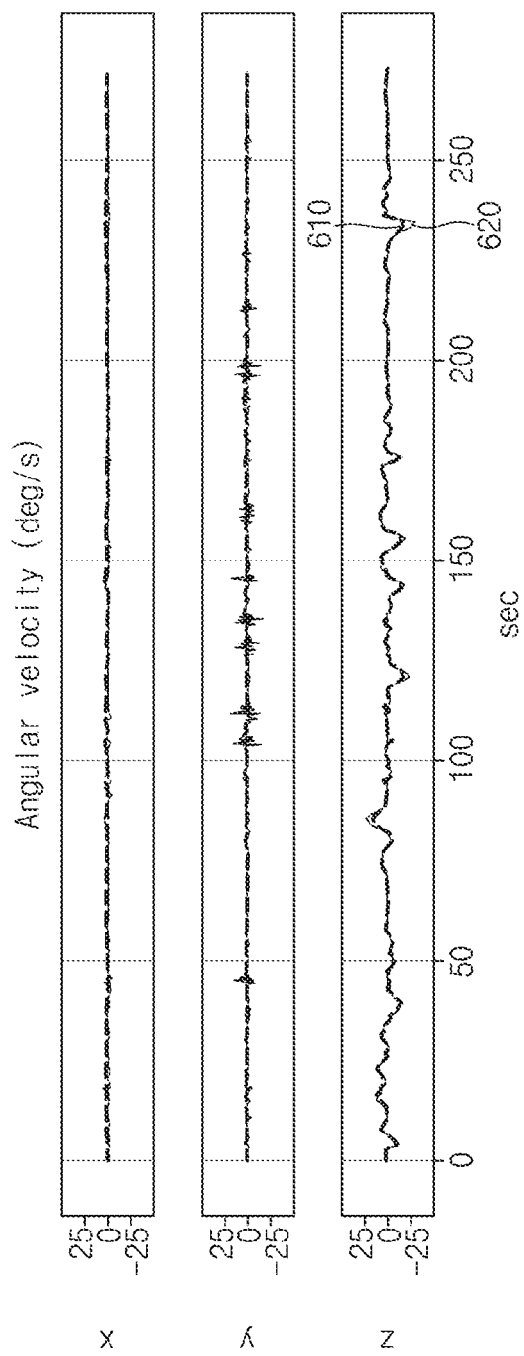
FIG. 6 is a view illustrating one example of the operation of a diagnostic device provided in an apparatus for diagnosing an abnormality in a vehicle sensor according to an embodiment of the present disclosure.

FIG. 6 is a view illustrating one example of the operation of a diagnostic device provided in an apparatus for diagnosing an abnormality in a vehicle sensor according to an embodiment of the present disclosure.

As shown in FIG. 6, because the deviation between an angular velocity 610 estimated by the 6D estimation network 54 and an angular velocity 620 measured by the sensor 20 for a reference time (e.g., 5 seconds) does not exceed a threshold, the diagnostic device 55 may diagnose that there is no abnormality in the sensor 20. In this case, for example, the threshold may be set to 10% of the angular velocity 610 estimated by the 6D estimation network 54.

Figure 7:
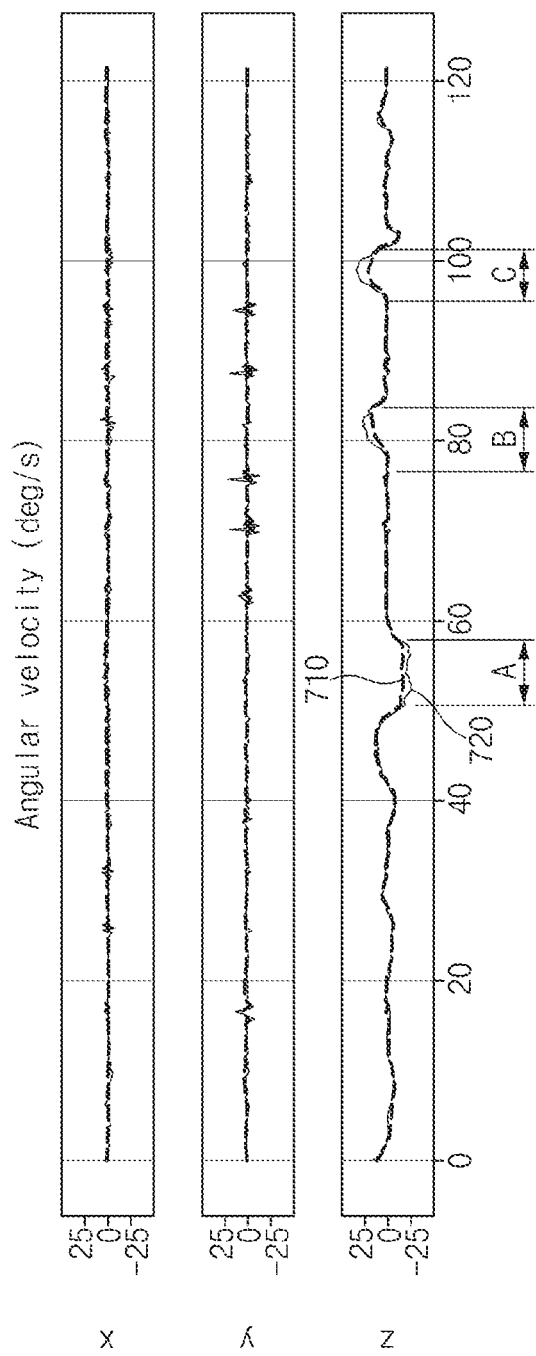
FIG. 7 is a view illustrating another example of the operation of a diagnostic device provided in an apparatus for diagnosing an abnormality in a vehicle sensor according to an embodiment of the present disclosure.

FIG. 7 is a view illustrating another example of the operation of a diagnostic device provided in an apparatus for diagnosing an abnormality in a vehicle sensor according to an embodiment of the present disclosure.

As shown in FIG. 7, because there are sections A, B and C in which the deviation between an angular velocity 710 estimated by the 6D estimation network 54 and an angular velocity 720 measured by the sensor 20 for a reference time (e.g., 5 seconds) exceeds a threshold, the diagnostic device 55 may diagnose that the sensor 20 is abnormal. In this case, the diagnostic device 55 may correct the angular velocity 720 measured by the sensor 20 based on the angular velocity 710 estimated by the 6D estimation network 54 in the sections A, B and C. In this case, the section A indicates that the deviation occurs when turning left and the sections B and C indicate that the deviation occurs when turning right.

Figure 8:
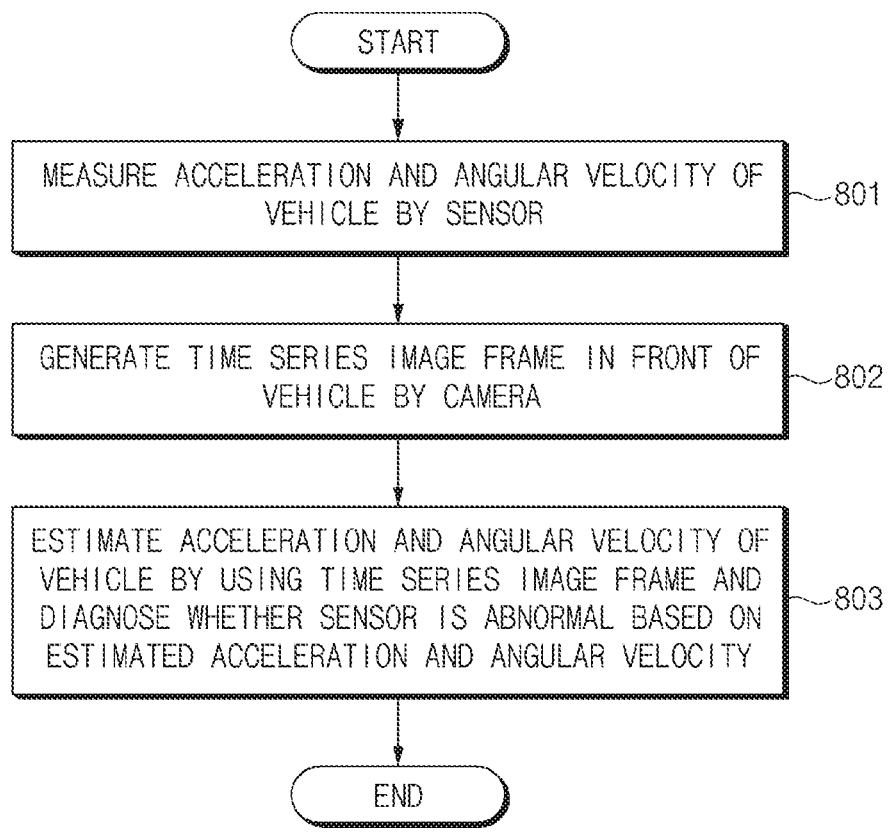
FIG. 8 is a flowchart illustrating a method for diagnosing an abnormality in a vehicle sensor according to an embodiment of the present disclosure.

FIG. 8 is a flowchart illustrating a method for diagnosing an abnormality in a vehicle sensor according to an embodiment of the present disclosure.

First, in operation 801, the sensor 20 measures the acceleration and angular velocity of the vehicle.

Then, in operation 802, the camera 30 generates the front time series image frame of the vehicle.

Thereafter, in operation 803, the controller 50 estimates the acceleration and angular velocity of the vehicle by using the time series image frame generated by the sensor 20, and diagnoses the abnormality in the sensor 20 based on the estimated acceleration and angular velocity. That is, the controller 50 predicts the first pose information of the camera by using the image at the time point of t−1 and the image at the time point of t and the second pose information of the camera by using the image at the time point of t−2 and the image at the time point of t−1. The controller 50 estimates the acceleration and angular velocity of the vehicle by using the first pose information and the second pose information, and compares the estimated acceleration with the measured acceleration to diagnose whether the acceleration sensor is abnormal. In addition, the controller 50 compares the estimated angular velocity with the measured angular velocity to diagnose whether the gyro sensor is abnormal.

Figure 9:
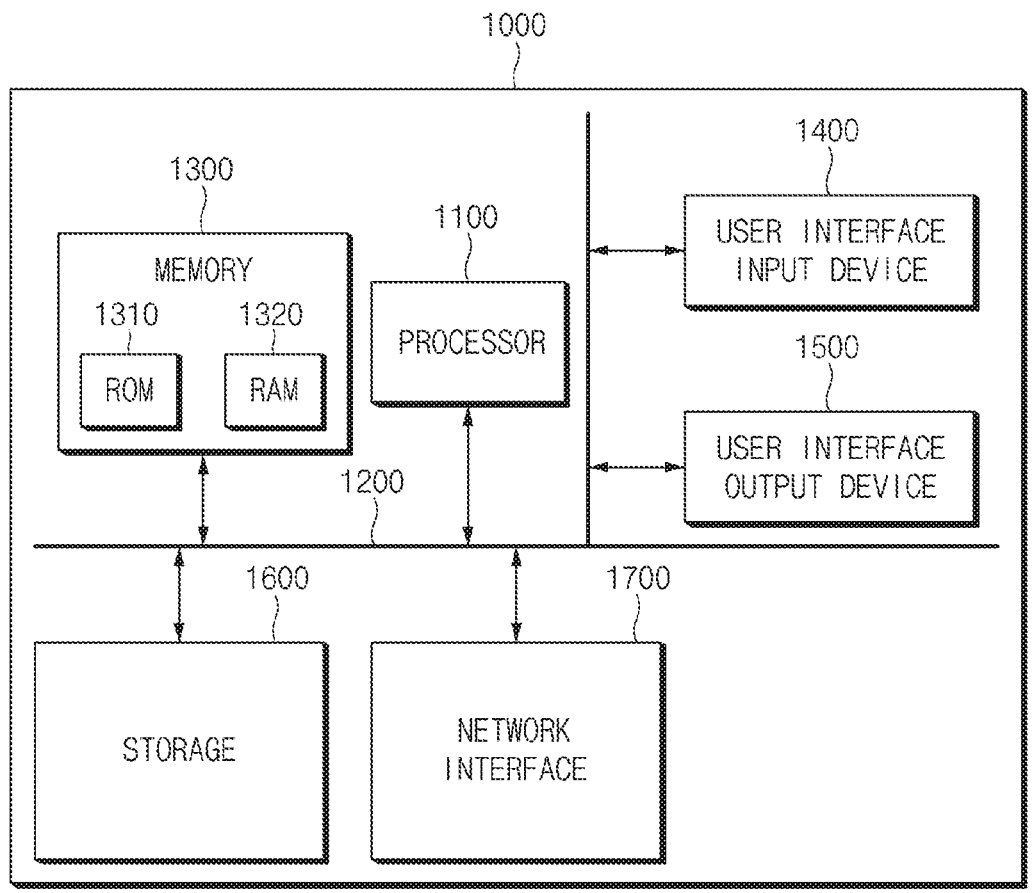
FIG. 9 is a block diagram illustrating a computing system for executing a method of diagnosing an abnormality in a vehicle sensor according to an embodiment of the present disclosure.

FIG. 9 is a block diagram illustrating a computing system for executing a method of diagnosing an abnormality in a vehicle sensor according to an embodiment of the present disclosure.

Referring to FIG. 9, as described above, a method of diagnosing an abnormality in a vehicle sensor according to an embodiment of the present disclosure may be implemented through a computing system. The computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the apparatus for diagnosing an abnormality in a vehicle sensor of an embodiment and the method thereof, the vehicle behavior may be estimated by using the time series image frame of the camera mounted on the vehicle and may diagnose an abnormality in the vehicle sensor based on the estimated behavior information, such that it is possible to prevent traffic accidents from occurring due to the abnormality in the vehicle sensor.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for diagnosing an abnormality of a vehicle sensor, the apparatus comprising:
   a sensor configured to measure an acceleration and an angular velocity of a vehicle;
   a camera configured to generate a front time series image frame of the vehicle; and
   a controller configured to estimate the acceleration and the angular velocity of the vehicle by using the front time series image frame generated by the camera and to diagnose an abnormality in the sensor based on the acceleration and the angular velocity of the vehicle estimated by the controller, wherein the controller comprises:
   a first pose network configured to predict first pose information of the camera by using an image at a time point of t−1 and an image at a time point of t;
   a second pose network configured to predict second pose information of the camera by using an image at a time point of t−2 and the image at the time point of t−1;
   a 6-dimension (6D) estimation network configured to estimate the acceleration and the angular velocity of the vehicle by using the first pose information and the second pose information; and
   a diagnostic device configured to compare the acceleration and the angular velocity of the vehicle estimated by the 6D estimation network with the acceleration and the angular velocity of the vehicle measured by the sensor to diagnose the abnormality in the sensor, wherein the diagnostic device is configured to diagnose that the abnormality occurs in an acceleration sensor in the sensor when an error of the acceleration measured by the acceleration sensor is not included in a first error range based on the accelerations estimated by the 6D estimation network.

2. The apparatus of claim 1, wherein the diagnostic device is configured to diagnose that the abnormality occurs in a gyro sensor in the sensor when an error of the angular velocity measured by the gyro sensor is not included in a second error range based on the angular velocity estimated by the 6D estimation network.

3. The apparatus of claim 1, wherein the first pose information includes rotation information and location information.

4. The apparatus of claim 1, wherein the second pose information includes rotation information and location information.

5. The apparatus of claim 1, wherein the first and second pose networks are convolutional neural networks (CNNs).

6. The apparatus of claim 1, wherein the 6D estimation network includes a multi-layer perceptron network.

7. An apparatus for diagnosing an abnormality of a vehicle sensor, the apparatus comprising:
- a sensor configured to measure an acceleration and an angular velocity of a vehicle;
- a camera configured to generate a front time series image frame of the vehicle; and
- a controller configured to estimate the acceleration and the angular velocity of the vehicle by using the front time series image frame generated by the camera and to diagnose an abnormality in the sensor based on the acceleration and the angular velocity of the vehicle estimated by the controller, wherein the controller comprises:
- a pose network configured to predict first pose information of the camera by using an image at a time point of t−1 and an image at a time point of t and second pose information of the camera by using an image at a time point of t−2 and the image at the time point of t−1;
- a 6D estimation network configured to estimate the acceleration and the angular velocity of the vehicle by using the first pose information and the second pose information; and
- a diagnostic device configured to compare the acceleration and the angular velocity of the vehicle estimated by the 6D estimation network with the acceleration and the angular velocity of the vehicle measured by the sensor to diagnose the abnormality in the sensor, wherein the diagnostic device is configured to diagnose that the abnormality occurs in an acceleration sensor in the sensor when an error of the acceleration measured by the acceleration sensor is not included in a first error range based on the acceleration estimated by the 6D estimation network.

8. The apparatus of claim 7, wherein the diagnostic device is configured to diagnose that the abnormality occurs in a gyro sensor in the sensor when an error of the angular velocity measured by the gyro sensor is not included in a second error range based on the angular velocity estimated by the 6D estimation network.

9. The apparatus of claim 7, wherein the first pose information includes rotation information and location information.

10. The apparatus of claim 7, wherein the second pose information includes rotation information and location information.

11. The apparatus of claim 7, wherein the pose network is a convolutional neural network (CNN).

12. The apparatus of claim 7, wherein the 6D estimation network includes a multi-layer perceptron network.

13. A method of diagnosing an abnormality of a vehicle sensor, the method comprising:
- measuring, by a sensor, an acceleration and an angular velocity of a vehicle;
- generating, by a camera, a front time series image frame of the vehicle; and
- estimating the acceleration and the angular velocity of the vehicle by using the front time series image frame generated by the camera and diagnosing whether there is an abnormality in the sensor based on the acceleration and the angular velocity of the vehicle estimated by the controller, wherein diagnosing whether there is an abnormality in the sensor comprises:
  - predicting first pose information of the camera by using an image at a time point of t−1 and an image at a time point of t;
  - predicting second pose information of the camera by using an image at a time point of t−2 and the image at the time point of t−1;
  - estimating the acceleration and the angular velocity of the vehicle by using the predicted first pose information and the predicted second pose information;
  - determining whether there is an abnormality in an acceleration sensor by comparing the estimated acceleration with the measured acceleration; and
  - determining whether there is an abnormality in a gyro sensor by comparing the estimated angular velocity with the measured angular velocity;
- wherein determining whether there is the abnormality in the acceleration sensor includes:
  - determining whether an error of the measured acceleration is included in a first error range based on the estimated acceleration;
  - diagnosing that an abnormality occurs in the acceleration sensor when the error of the measured acceleration is not included in the first error range, as a determination result; and
  - diagnosing that the abnormality does not occur in the acceleration sensor when the error of the measured acceleration is included in the first error range, as the determination result.

14. The method of claim 13, wherein determining whether there is the abnormality in the gyro sensor includes:
- determining whether an error of the measured angular velocity is included in a second error range based on the estimated angular velocity;
- diagnosing that an abnormality occurs in the gyro sensor when the error of the measured angular velocity is not included in the second error range, as a determination result; and
- diagnosing that the abnormality does not occur in the gyro sensor when the error of the measured angular velocity is included in the second error range, as the determination result.

15. The method of claim 13, wherein the first pose information includes rotation information and location information and wherein the second pose information includes rotation information and location information.

16. The method of claim 13, wherein the first pose information includes rotation information and location information.

17. The method of claim 13, wherein the second pose information includes rotation information and location information.

* * * * *